Figure 1:
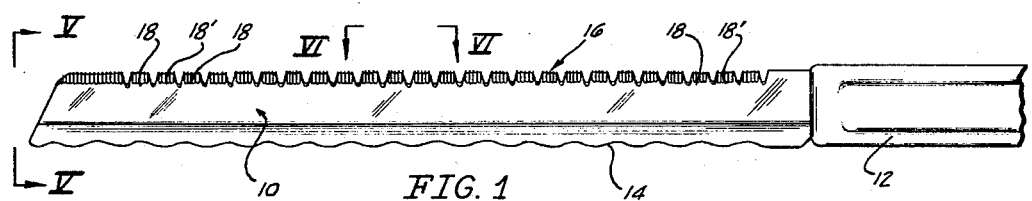

Oct. 18, 1966  C. F. SENKEWITZ  3,279,065
KNIFE
Filed May 21, 1964

INVENTOR
CHARLES F. SENKEWITZ
BY Beaman & Beaman
ATTORNEYS

United States Patent Office 3,279,065
Patented Oct. 18, 1966

3,279,065
KNIFE
Charles F. Senkewitz, Brooklyn, Mich.
Filed May 21, 1964, Ser. No. 369,086
3 Claims. (Cl. 30—355)

The invention pertains to a knife, and particularly relates to a knife suitable for cutting foods while in the frozen state.

It is often of advantage to sever frozen foods without defrosting the food. For instance, it is common to desire to cut a portion of frozen hamburger from a larger portion thereof. However, in that the frozen state of the food imparts a hardness to the food which resists cutting with conventional knife edges, it is necessary to thaw the food before it may be cut. As refreezing is usually not recommended, the entire amount of frozen food must then be used within the period of time before spoiling takes place. Frozen meats and other frozen foods may be severed or broken while in the frozen state by employing a cleaver. However, such a severing instrument is difficult to use, dangerous, and often breaks the frozen food into smaller particles than desired. In attempting to cut frozen food with conventional knives having serrated teeth, the knife teeth quickly clog with the food and cease to operate efficiently. Also, as conventional serrated toothed knives enter the incision formed in the food, they tend to freeze and stick to the food as the knife blade assumes the temperature of the food.

It is an object of the invention to provide a knife which may be used for domestic purposes wherein frozen foods of a wide variety may be successfully severed with a minimum expenditure of energy and under safe conditions.

Another object of the invention is to provide a knife particularly adapted for severing frozen foods wherein the cutting portions of the knife blade are so constructed as to prevent the blade from sticking to the food as it passes through the incision being formed.

An additional object of the invention is to provide a toothed knife capable of cutting frozen foods wherein the cutting teeth defined on the knife are self-cleaning and the cutting action occurs during both directions of knife movement.

Yet a further object of the invention is to provide a knife capable of cutting frozen foods wherein the knife includes a cutting edge on which is defined a plurality of cutting portions each having sharpened side edges and a terminating edge. Each of the terminating edges is defined by a plurality of cutting teeth, and the terminating edges of selected cutting portions are laterally deflected with respect to other cutting portions whereby the effective width of the knife incision in frozen food will be greater than the thickness of the knife blade.

Figure 2:
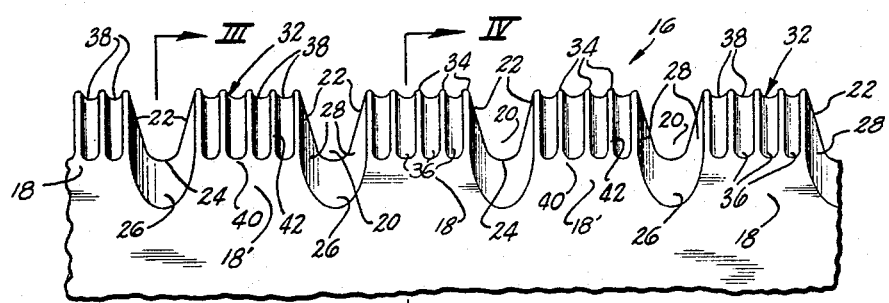
Figure 3:
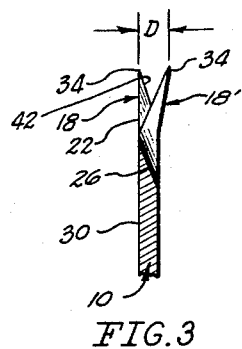
Figure 4:
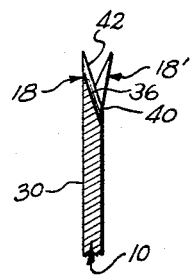
Figure 5:
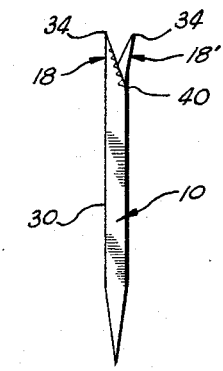
Figure 6:
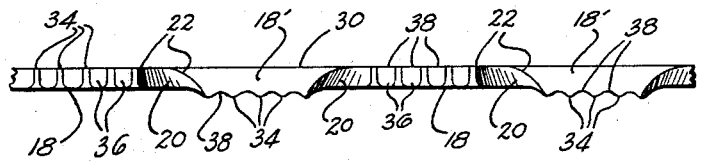

These and other objects of the invention arising from the details and relationships of the components of an embodiment thereof will be apparent from the following description and accompanying drawings wherein:

FIG. 1 is an elevational view of a knife constructed in accord with the invention, FIG. 2 is an elevational, enlarged, detail view of the cutting edge of a knife constructed in accord with the invention, FIG. 3 is a sectional, elevational view as taken through the base edge of a cutting portion recess along section III—III of FIG. 2, FIG. 4 is an elevational, detail, enlarged, sectional view of a tooth groove taken along section IV—IV of FIG. 2, FIG. 5 is an elevational end view of the knife blade as taken along section V—V of FIG. 1, and FIG. 6 is an enlarged, detail, plan view of the cutting edge in accord with the invention.

FIG. 1 illustrates a double edged knife blade incorporating the concepts of the invention. The blade 10 is of the usual planar sheet configuration and is provided with a conventional handle 12 affixed at one end thereto, only a portion of the handle being illustrated. In the illustrated embodiment, the blade 10 is provided with a conventional cutting edge 14 of a sinuous form such as is conventionally used for cutting bread, meats, etc.

The blade 10 also includes the cutting edge 16 defined upon the opposite longitudinal edge of the blade with respect to the sinuous cutting edge 14. The cutting edge 16 is provided with a plurality of identical cutting portions 18 and 18'. The adjacent cutting portions 18 and 18' are separated by a recess 20 defined therebetween. The recesses 20 are each defined by the opposed side edges 22 of adjacent cutting portions and include a base edge 24 which interconnects the side edges 22 of the adjacent cutting portions. The recesses 20, side edges 22, and base edge 24 are defined in the blade by grinding the blade to a sufficient depth to simultaneously define the tapered surface 26 and the tapered side edge surfaces 28. Of course, the side edges 22 and the base edge 24 constitute the line of intersection of the ground tapered surfaces 26 and 28, respectively, with the side 30 of the blade during manufacture. It will be appreciated that the edges 22 and 24 will be very sharp due to the tapered surfaces 28 and 26 and, preferably, the base edge 24 will be of a concave, arcuate configuration which is conducive to self-cleaning, as will be later discussed.

Each of the cutting portions 18 and 18' includes a terminating edge generally indicated at 32. A plurality of cutting teeth 34 are defined upon the terminating edge of each cutting portion. The cutting teeth 32 are formed by grinding a plurality of parallel, tapered grooves 36, FIGS. 2 and 4, in each of the cutting portions, whereby the grooves intersect the blade side 30 to define arcuate, concave recess edges 38. The outer portions of the cutting portions 18 and 18' between the apex of the teeth 34 and the portion 40 are also beveled, as will be apparent from FIG. 4, whereby the apex of the cutting teeth 34 may be of a rounded configuration but, yet, is sharp due to the angle of the beveled surface 42. In this manner a plurality of rounded and sharpened teeth 34 are located upon the terminating edge 32 of each cutting portion 18 and 18' having a concave recess edge 38 defined between adjacent teeth. It will be appreciated that the concave grooves 36 also produce sharp side edges upon the teeth 34 whereby a very effective tooth for cutting frozen goods is produced which is also of a self-cleaning nature.

In the disclosed embodiment, alternate cutting portions designated 18' are laterally displaced with respect to the longitudinal length of the blade 10. This relationship will be appreciated from FIGS. 3 through 6. The amount of lateral displacement of the cutting portions 18' is sufficient to produce a transverse spacing between the terminating edges 32 of the portions 18 and 18', as indicated by the distance D, FIG. 3, which is greater than the thickness of the blade 10. Thus, as the knife is reciprocated with the cutting teeth 34 in engagement with a frozen food, the knife will produce an incision in the food which is of a width greater than the blade 10. The increased width of the incision prevents the blade from freezing to the food, which is a common fault with conventional serrated toothed knives when used with frozen foods.

Due to the lateral deflection of the alternate cutting portions 18', with respect to the portions 18, it will be appreciated that the opposed sharpened side edges 22 defining a common recess 20 will not be aligned in a longitudinal direction with respect to the blade and, thus, the sharpened edges 22 will effectively provide a cutting action, as well as do the teeth 34. As the knife is reciprocated during a cutting operation, the chips of food which are cut away by the teeth 34 and edges 22 will not tend to accumulate within the recesses 20 or between teeth 34 due to the self-cleaning characteristics of the concave recesses. In this regard it will be noted that as the side edges 22 of a common recess 20 diverge in the direction toward the terminating edge of the associated cutting portion, this fact also promotes self-cleaning.

In the disclosed embodiment, only alternate cutting portions 18' have been laterally deflected with respect to the plane of the blade 10. However, it is within the scope of the invention that the cutting portions 18 may be deflected in the opposite direction with respect to the plane of the blade 10 and the direction of deflection of the cutting portions 18'. Such a construction will, of course, increase the width of the incision produced by the knife.

It will, therefore, be appreciated that the combination of the unique arrangement of the cutting portions 18 and 18', the deflection of the cutting portions 18' to produce an incision wider than the blade, and the unique configuration of the cutting edges 22 and cutting teeth 34 provide a knife which is capable of effectively cutting frozen foods with a self-cleaning action.

It is appreciated that various modifications to the disclosed embodiment may be apparent to those skilled in the art without departing from the spirit and scope of the invention, and it is intended that the invention be defined only by the scope of the following claims.

I claim:
1. A knife particularly characterized by its ability to sever frozen foods comprising, in combination,
    (a) an elongated blade having a given thickness and a cutting edge defined thereon,
    (b) first and second alternately disposed cutting portions defined on said cutting edge, said cutting portions each including a terminating edge, at least said second cutting portions being laterally deflected relative to the length of said blade in a common lateral direction whereby the terminating edges of said second cutting portions laterally deflected are in substantial longitudinal alignment with each other, lateral deflection of said second cutting portions being sufficient to define a lateral spacing between the terminating edges of said first and second cutting portions of a distance greater than the thickness of said blade,
    (c) sharpened side edges defined on said cutting portions defining the length of each of said cutting portions in the direction of the longitudinal length of said blade and extending the depth of the associated cutting portion,
    (d) a recess defined in said blade cutting edge intermediate adjacent cutting portions, said recesses being defined by the opposing side edges of adjacent cutting portions and including a sharp concave base edge interconnecting the opposed side edges of the adjacent cutting portions, the opposed side edges defining a common recess diverging relative to each other in the direction of the terminating edge of said cutting portions and being laterally displaced relative to each other due to the lateral deflection of alternate cutting portions,
    (e) a plurality of spaced cutting teeth defined on said terminating edge of each of said cutting portions, said cutting teeth being defined by sharp side edges and an apex, and
    (f) a concave recess defined between adjacent teeth interconnecting the opposing side edges of adjacent teeth.

2. In a knife particularly characterized by its ability to sever frozen foods as in claim 1 wherein:
    (a) said cutting teeth apexes are of a convex configuration.

3. In a knife particularly characterized by its ability to sever frozen foods as in claim 1 wherein:
    (a) said cutting portions each include a tapered surface defined on a common side of said blade intersecting the terminating edge of the associated cutting portion to define a sharp terminating edge,
    (b) a plurality of spaced, parallel, concave grooves defined in each of said cutting portions, tapered surfaces intersecting said sharp terminating edge thereof to form said teeth and said concave recesses therebetween, the sharp terminating cutting portion edge intermediate said concave grooves defining rounded convex teeth apexes.

References Cited by the Examiner
UNITED STATES PATENTS

| | | | |
|---|---|---|---|
| 1,494,576 | 5/1924 | Biedermann et al. | 143—133 |
| 1,911,974 | 5/1933 | Shelton | 30—355 |
| 2,059,414 | 11/1936 | Taylor | 30—355 |
| 2,799,930 | 7/1957 | Champlin | 30—355 |
| 2,825,968 | 3/1958 | Baer | 30—355 |
| 3,205,575 | 9/1965 | Senkewitz | 30—355 |

WILLIAM FELDMAN, *Primary Examiner.*

EDWARD C. ALLEN, *Examiner*

G. WEIDENFELD, *Assistant Examiner.*